US012368011B2

(12) United States Patent
Oberst et al.

(10) Patent No.: US 12,368,011 B2
(45) Date of Patent: Jul. 22, 2025

(54) MODULE FOR GENERATING OPENING SIGNALS

(71) Applicant: Illinois Tool Works Inc., Glenview, IL (US)

(72) Inventors: Joachim Oberst, Großrinderfeld (DE); Zsolt Wilke, Bad Mergentheim (DE); Erik Dilje, Würzburg (DE); Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 31 days.

(21) Appl. No.: 18/213,435

(22) Filed: Jun. 23, 2023

(65) Prior Publication Data

US 2023/0420201 A1 Dec. 28, 2023

(30) Foreign Application Priority Data

Jun. 24, 2022 (DE) ..................... 10 2022 115 841.1

(51) Int. Cl.
*H01H 21/22* (2006.01)
*H01H 1/14* (2006.01)
*H01H 21/04* (2006.01)

(52) U.S. Cl.
CPC .............. *H01H 21/22* (2013.01); *H01H 1/14* (2013.01); *H01H 21/04* (2013.01)

(58) Field of Classification Search
CPC ...... H01H 13/08; H01H 13/50; H01H 13/183; H01H 71/52; H01H 71/521;
(Continued)

(56) References Cited

U.S. PATENT DOCUMENTS 7,244,897 B2 7/2007 Villagrasa
8,629,361 B2 1/2014 Koyama
(Continued)

FOREIGN PATENT DOCUMENTS

DE 102005034763 B3 9/2006
DE 202006011116 U1 9/2006
(Continued)

OTHER PUBLICATIONS

Examination Report dated Mar. 1, 2023 in German application No. 10 2022 115 841.1, filed on Jun. 24, 2022 (8 pages).
(Continued)

*Primary Examiner* — Anthony R Jimenez
(74) *Attorney, Agent, or Firm* — McAndrews, Held & Malloy, Ltd.

(57) ABSTRACT

The present disclosure relates to a module (100) for generating signals, in particular signals for opening vehicle doors or flaps. The module (100) includes: a one-piece housing (102) having a plug region (106) and a switch region (104); at least one switch, in particular a microswitch (108), which is connected releasably to the switch region (104) of the housing; and electrical contacts (110, 112), which are releasably connectable to the at least one switch and extend from the switch region (104) at least partially into the plug region (106). The electrical contacts are configured in order to produce an electrical contact with an on-board plug for transmitting an electrical signal, wherein the housing (102) is preferably releasably connectable to a vehicle component, preferably an operator element housing, and particularly preferably a door lever housing.

20 Claims, 10 Drawing Sheets

(58) Field of Classification Search
CPC .. H01H 2009/06; H01H 2021/22; H01H 3/16; H01H 21/00; H01H 21/04; H01H 21/06; H01H 21/08; H01H 21/10; H01H 21/22; H01H 21/36; H01H 1/14; H01H 9/02; H01H 9/06; H01H 9/20
USPC .......................................................... 200/335
See application file for complete search history.

(56) References Cited

U.S. PATENT DOCUMENTS

| | | | | |
|---|---|---|---|---|
| 8,809,710 | B2 | 8/2014 | Ulomek | |
| 9,030,789 | B2 * | 5/2015 | Benoit | H02H 3/162 361/42 |
| 2020/0031209 | A1 | 1/2020 | Fukui | |
| 2021/0340793 | A1 | 11/2021 | Oberst | |

FOREIGN PATENT DOCUMENTS

| | | | |
|---|---|---|---|
| EP | 1431994 | A2 | 6/2004 |
| EP | 1568053 | A1 | 8/2005 |
| EP | 1677324 | A2 | 7/2006 |
| EP | 2800117 | A1 | 11/2014 |
| EP | 2886760 | A1 | 6/2015 |
| EP | 3044040 | A1 | 7/2016 |
| EP | 3044040 | B1 | 6/2017 |
| FR | 2865708 | A1 | 8/2005 |
| WO | 2004042177 | A1 | 5/2004 |

OTHER PUBLICATIONS

Examination Report dated Apr. 1, 2023 in German application No. 10 2022 115 843.8, filed on Jun. 24, 2022 (7 pages).
Examination Report dated Apr. 1, 2023 in German application No. 10 2022 115 844.6, filed on Jun. 24, 2022 (6 pages).

* cited by examiner

100

200

MODULE FOR GENERATING OPENING SIGNALS

RELATED APPLICATION

The present application claims the benefit of German Patent Application No. 10 2022 115 841.1, filed Jun. 24, 2022, the contents of which are hereby incorporated by reference.

BACKGROUND

Signal generators are required to control drives, in particular electrical drives, that enable the automatic opening of a vehicle door. The signal generators are designed as microswitches, for example, and are typically actuated by the user. For this purpose, the switches for signal generation can be connected to various actuation mechanisms, such as knobs or levers. To open the vehicle door, the actuation mechanism, for example a door lever, is moved to an open position by the user, thereby closing the switch and therefore an electrical drive circuit.

For example, the vehicle doors can consist of a sliding door or a swing door. In particular, due to the narrow interior of such vehicle doors, it is often very complex and challenging to achieve a reliable connection between the contacts of the switch and the electrical drive. Also, premature wear of the switch can occur very quickly.

Based on the aforementioned problem, the object of the disclosure is to simplify the installation of signal generators or to improve hold times.

SUMMARY

The disclosure relates to a module for generating signals, in particular signals for opening vehicle doors or flaps, substantially as illustrated by and described in connection with at least one of the figures, as set forth more completely in the claims. According to a further aspect, the disclosure relates to an actuation mechanism and a vehicle having the module according to the disclosure. The disclosure will be described in further detail below with respect to the examples shown in the figures.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
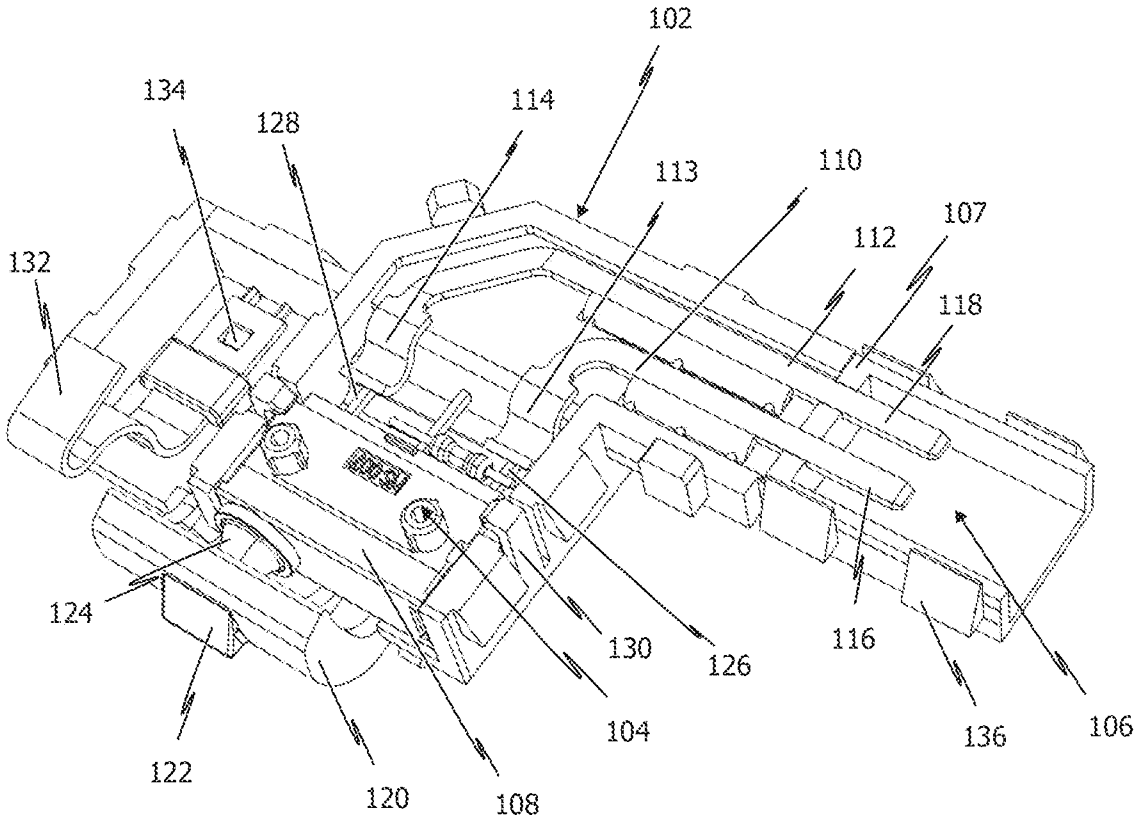
FIG. 1 is a schematic top perspective view of a module according to an example of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Accordingly, the present disclosure relates to a module for generating signals, in particular signals for opening vehicle doors or flaps, the module comprising: a one-piece housing (102) having a plug region (106) and a switch region (104); at least one switch, in particular a microswitch (108), which is connected, in particular releasably connected, to the switch region (104) of the housing; electrical contacts (110, 112), which are releasably connectable to the at least one switch and extend from the switch region (104) at least partially into the plug region (106), wherein the electrical contacts are designed in order to produce an electrical contact with an on-board plug for transmitting an electrical signal, wherein the housing (102) is preferably releasably connectable to a vehicle component, preferably an operating element housing, and particularly preferably a door lever housing.

The module according to the disclosure significantly simplifies the installation of the switch into a vehicle door. In particular, the module is a prefabricated component which connects a switch and a plug region, i.e. electrical contacts for connecting to an electrical drive, in a one-piece housing. The purpose-designed housing also ensures that the micro-switch is repeatedly precisely aligned and reliably connected to the electrical contacts of the plug region. Accordingly, the switch does not need to be connected to an outlet by hand using loose cables. Rather, the plug socket or plug region and the switch are already integrated into a one-piece module. Accordingly, there are not only advantages in the installation of the signal generator, but the reliability of the connection between the switch and the electrical drive is also improved, since loose cables in the vehicle door space can be largely omitted.

According to an example of the present disclosure, the plug region comprises a socket for receiving the on-board plug, in particular a plug of a control unit or an electrical drive/actuator. The plug region of this example is thus designed as a socket into which the ends of the electrical contacts extend. The module therefore does not serve only to receive the switch and to establish a reliable connection to electrical contacts. Rather, it simultaneously comprises a socket for receiving a corresponding electrical contact plug of the electrical drive. Accordingly, after installation of the module, the plug of the electrical drive must only be inserted into the socket of the module in order to produce a reliable electrical connection between the switch and the drive.

According to an alternative example, the plug region is designed such that the plug region together with the operating element housing forms a socket for receiving a plug, in particular a plug of a control unit or an electrical drive/actuator. In other words, the plug region of the module can form a sub-region of the socket, while another sub-region of the socket is formed by the operating element housing. Accordingly, the position in the socket can already be predetermined by the operating element housing, whereby an exact arrangement of the module and thus the switch with respect to the operating element housing is simultaneously achieved.

According to a further example, the at least one switch is arranged so as to be activated by the movement of an operating element, wherein the module comprises a first resetting element that is designed to act against a movement of the operating element. The operating element itself is not part of the module according to the disclosure. The module can nonetheless be used simultaneously to provide pretensioning against movement of the operating element. Thus, the first resetting element allows the operating element associated with the microswitch to be pretensioned to its closed position. When the operating element is actuated, it is moved against the resetting force of the first resetting element. Thereby the module according to the disclosure not only ensures a safe and simple connection between the switch and the electrical actuator. Rather, the module simultaneously also enables an automatic reset of the operating element to its closed position. The first resetting element can be designed in a variety of ways for this purpose. For example, the first resetting element can consist of a flat spring or wire spring to keep the installation space of the resetting element as small as possible.

According to a further example, the first resetting element can be designed to generate a haptic and/or acoustic signal when the operating element activates the at least one switch. For example, the resetting element can be formed as a cracker that folds over according to a particular deformation path and produces a typical snap sound. The resetting force also changes during the folding process, at least temporarily, resulting in haptic feedback. According to this example, the first resetting element can be used to provide feedback to the user when the operating element has been moved sufficiently to activate the microswitch. For example, the operating element can be designed as a door lever, wherein the microswitch is activated when the lever is pivoted by about 5%. Accordingly, the resetting element can be designed such that the cracker is folded when the lever is pivoted by 5°.

According to a further example, the at least one switch is arranged so as to be activated by the movement of an operating element, wherein the module comprises a second resetting element, in particular a resetting spring, which is designed to act against a further movement of the operating element after it has activated the at least one switch. Here as well, it should be mentioned that the operating element is preferably not part of the module according to the disclosure. Nonetheless, it comprises a resetting element, for example designed as a resetting spring, which generates resistance against the further movement of the operating element after activation of the microswitch on the one hand, but allows movement beyond the open position of the operating element for activating the microswitch on the other hand. This can, for example, serve to achieve an emergency release position of the operating element if the electrical drive fails. The second resetting element achieves resistance against further movement of the operating element after the microswitch has been activated. This resistance is initially perceived as a stop for the operating element by the user. However, when the user tries to move the operating element more strongly against the resistance, the second resetting element is deformed, accordingly permitting the operating element to move into the emergency release position. For example, the operating element can be designed as a door lever, in which a Bowden cable is activated by a further pull on the lever after the open position, which is coupled to a mechanical emergency release.

According to a further example, the module housing comprises snap connectors, in particular protrusions for snap hooks, for releasably connecting to the operating element housing. Alternatively, it is of course also conceivable for the housing itself to have snap hooks for engaging with corresponding undercuts of the operating element housing. In other words, the module housing is designed to be clipped into the operating element housing. This ensures quick and easy mounting of the module to the operating element housing. It can also be quickly and easily removed from the operating element housing and thus the corresponding vehicle door, for example if the microswitch needs to be replaced.

According to a further example, the module comprises an actuating flap, which is pivotally connected to the housing and designed to transmit a movement of an operating element to the at least one switch so that the at least one switch is activated by a movement of the operating element. The actuating flap is arranged between the operating element and the switch in the installed state of the module. Since the actuating flap is hinged to the housing, it can be arranged very precisely opposite the switch, so that movement of the actuating flap can repeatably activate the switch. The actuating flap simultaneously represents a relatively large actuating surface for the operating element, meaning that tolerances are easily compensated when installing the module compared to the operating element.

According to a further example, the electrical contacts comprise a first elastic end contacting the at least one switch, wherein the first elastic end of the electrical contacts is respectively pretensioned against one of the contacts of the at least one switch, in particular as soon as the module is connected to the operating element housing. This ensures a reliable connection between the electrical contacts and the contacts of the switch, as the electrical contacts are pretensioned against the contacts of the switch. However, it is not necessary to pretension the contacts against the microswitch when manufacturing the module. Rather, the electrical contacts can be quickly and easily anchored to the module housing, wherein the pretensioning is automatically achieved by connecting the module to the operating element housing.

According to a further example, the electrical contacts extend substantially at a 90° angle between the switch region and the plug region of the device. Accordingly, the module housing can also be formed at a 90° angle. This makes it possible to activate the switch and insert the electrical drive contacts in planes perpendicular to each other. This is particularly advantageous for typically flat door panels, as they allow for a particularly narrow shape.

According to a further aspect, the present disclosure relates to an actuation mechanism for opening vehicle doors, wherein the actuation mechanism comprises an operating element housing having an operating element which can be moved therein, in particular a door lever, as well as an aforementioned module which is releasably connected to the operating element housing.

In a further aspect, the present disclosure relates to a vehicle having an actuation mechanism as described above.

FIG. 1 shows a first example of a module for generating opening signals in accordance with the present disclosure. The module 100 comprises a housing 102 having a plug region 106 and a switch region 104. The housing 102 shown herein is formed in one piece. This can be designed as a plastic body produced in the injection molding process, for example.

The housing 102 is designed as an upwardly open half-shell. The half-shell can be releasably connected to an operating element housing in particular, for example a door lever housing (not shown). For this purpose, the housing 102 can comprise a plurality of ramp-like protrusions 136, which serve to releasably connect the module 100 to the operating element housing, in particular to clip it. It should be noted that the housing 102 of the module alternatively also connects to many other moveable vehicle components, such as glove compartments, rear flaps, center arm rests, etc., to generate an electrical signal upon actuation of the vehicle components.

A switch, in particular a microswitch 108, is releasably connected to the switch region 104 of the housing 102. For this purpose, the housing 102 can comprise one or more receiving openings, which serve to orient the switch in relation to the housing 102. Furthermore, FIG. 1 shows snap connectors 130 which are formed as snap hooks and releasably connect the switch 108 to the housing. As described in further detail below, the switch 108 is in particular designed as a button; wherein, however, any further mechanical or electrical switch variant is also conceivable.

The module 100 comprises a first and second electrical contact 110, 112. The electrical contacts 110, 112 each comprise a first end 113, 114 and an opposing second end 116, 118. At the first ends 113, 114, the electrical contacts are connected to corresponding contacts of the switch 104. The first electrical contact 110 is connected at its first end 113 to a first contact 126 of the switch 108 in particular. The second electrical contact 112 is connected to a second electrical contact 128 of the switch 108 via its first end 114.

The second ends 116, 118 of the electrical contacts 110, 112 extend into a plug region 106 of the housing 102. The plug region 106 serves in particular to receive a corresponding plug for supplying voltage to an electrical drive or to supply any other consumer. For example, such a plug can be inserted into the plug region 106 and pushed onto the second ends 116, 118 of the electrical contacts 110, 112. For this purpose, the shape of the second ends 116, 118 is adapted to the respective plugs. In other words, the electrical contacts 110, 112 serve as adapters between the terminals of the switch 108 and the plug. The module can thereby be very easily adapted to different plugs, for example by attaching electrical contacts 110, 112 with alternatively shaped second ends (not shown). It is thereby not necessary to replace the switch 108.

For example, the second ends 116, 118 of the electrical contacts 110, 112 can be received in a rear wall 107 of the plug region 106. In the example shown, the rear wall 107 is in particular designed with two recesses, wherein each of the recesses serves as a guide for one of the two electrical contacts 110, 112.

The electrical contacts 110, 112 extend substantially perpendicularly, that is, at an angle of about 90°, between the first and second ends 113, 114, 116, 118.

In the example according to FIG. 1, the plug region 106 is formed as a half-shell. The first (e.g., "lower") half-shell shown here can be completed by a corresponding second (e.g., "upper") half-shell that is part of the operating element housing. The two half shells form a complete socket for receiving a corresponding plug of the electrical drive. Accordingly, once the second half-shell of the operating element housing is connected to the first half-shell, the electrical contacts are thereby fixedly connected to the rear wall 107 of the plug region 106.

Figure 2:
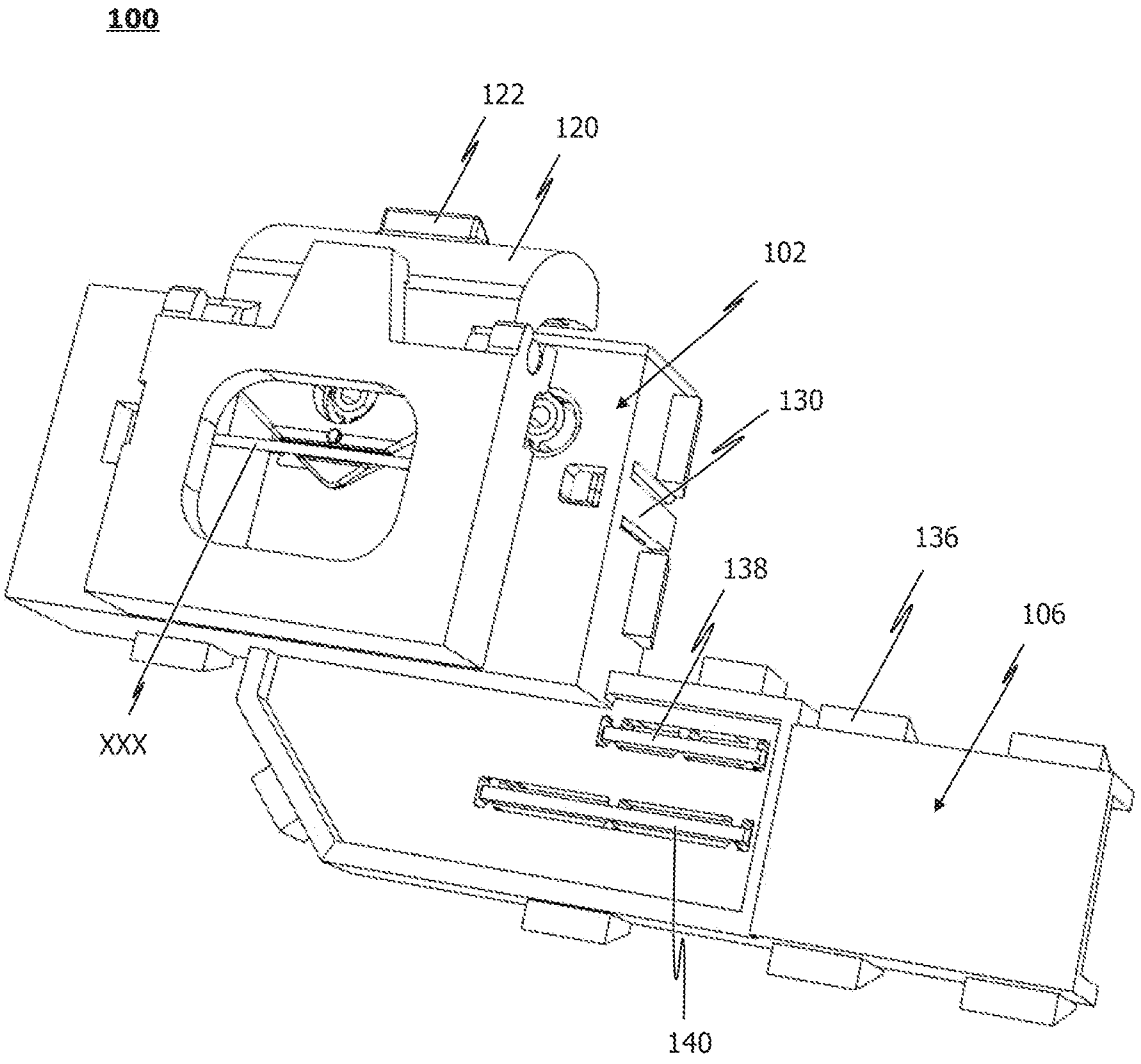
FIG. 2 is a schematic bottom perspective view of the module shown in FIG. 1.
Figure 6:
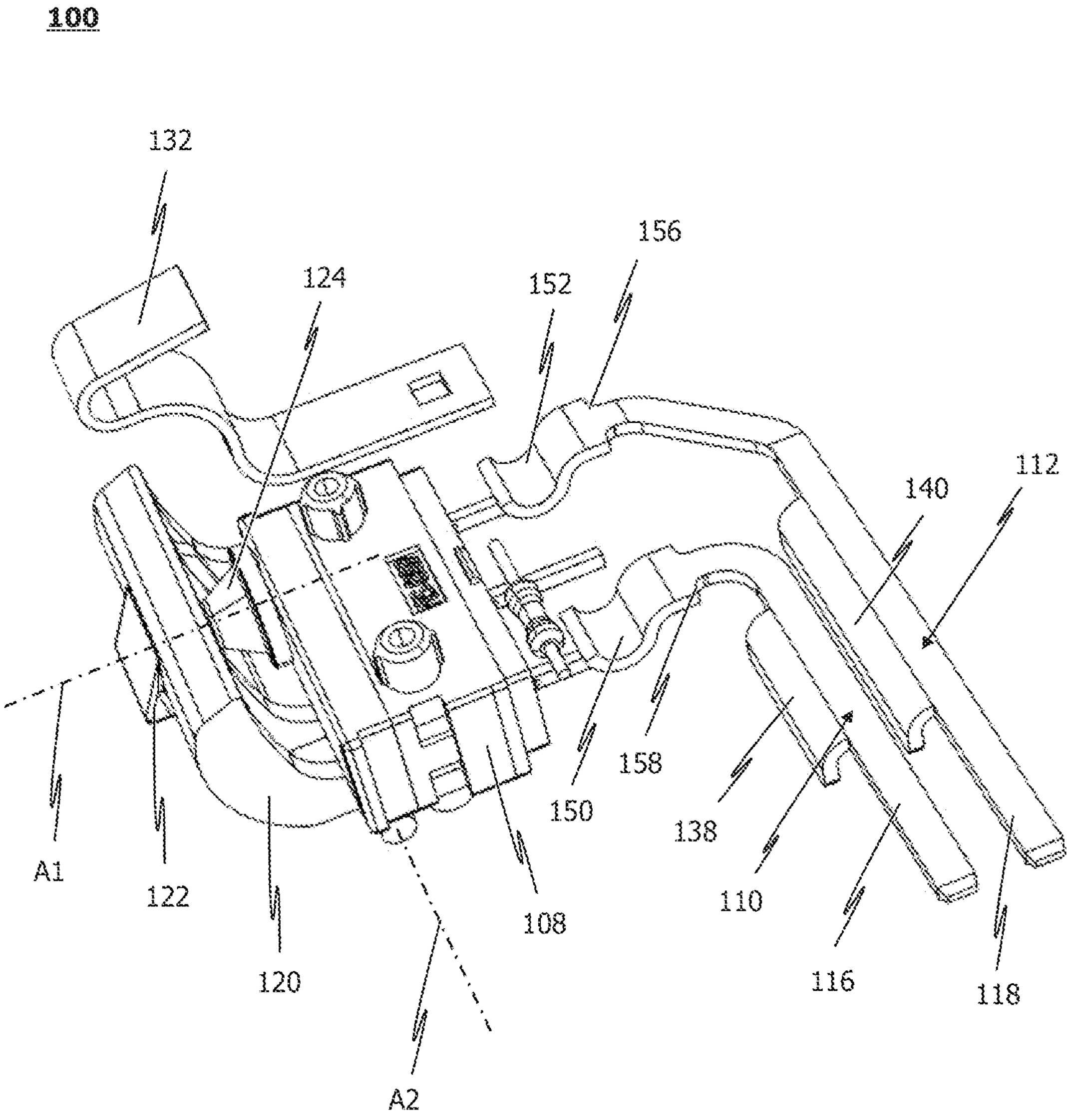
FIG. 6 is an exploded view of the components received in the housing.

It is furthermore evident from FIGS. 2 and 6 that the two electrical contacts 110, 112 are each equipped with anchoring elements 138, 140. The anchoring elements 138, 140 serve to releasably connect the electrical contacts to the housing 102. For this purpose, the anchoring elements 138, 140 are inserted into corresponding openings of the housing 102.

The first ends 113, 114 of the electrical contacts 110, 112 are designed elastically. Herein the first ends can in particular also be formed so that they are pretensioned against the first and second contacts 126, 128 of the switch 108 when the anchoring elements 138, 140 are inserted into the housing 102. In other words, elastic deformation of the first ends 113, 114 preferably occurs once the anchoring elements are inserted into the housing 102. This is the case because the first ends 113, 114 and the contacts 126, 128 of the switch are arranged to overlap each other when the electrical contacts are inserted into the housing.

Figure 3:
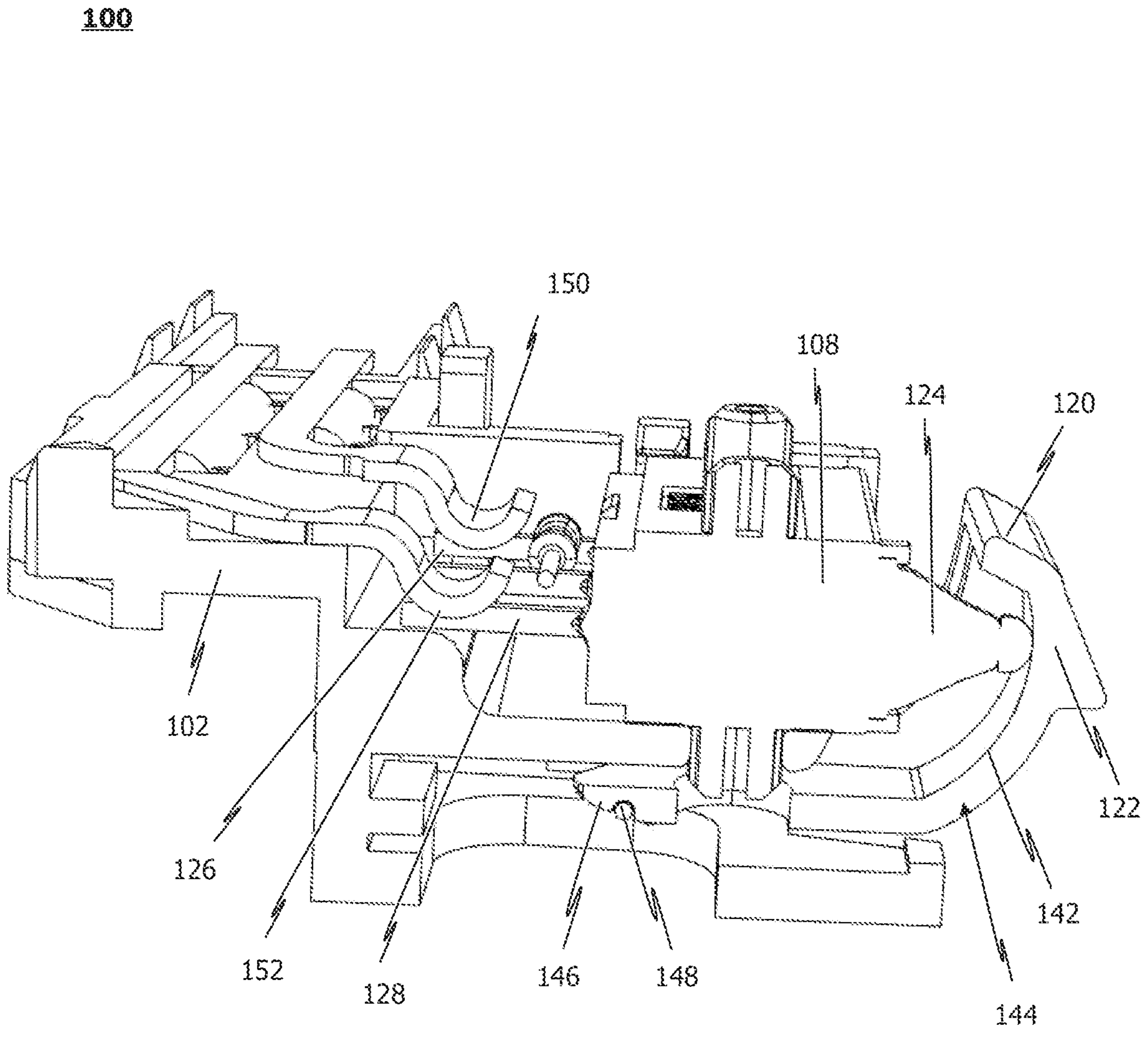
FIG. 3 is a schematic cross-section through the example of the module as shown in FIG. 1.

The first ends 113, 114 of the electrical contacts 110, 112 have white, arc-shaped, in particular U-shaped, regions 150, 152, as can be seen for example in FIG. 3. The arc-shaped regions 150, 152 of the electrical contacts 110, 112 are formed so that they protrude when installed relative to the remaining portions of the contacts. In other words, the arc-shaped regions 150, 152 are arranged outside the plane of the remaining regions of electrical contacts. Accordingly, it can be ensured that only the bent regions 150, 152 are pressed and deformed against the electrical contacts 128, 126 of the switch 108 when the electrical contacts are inserted into the housing 102. The electrical contacts 110, 112 can also be additionally pressed onto the electrical contacts 126, 128 of the switch 108 by the operating element housing when connected to the housing 102.

The arc-shaped regions 150, 152 are designed to establish a linear contact between the electrical contacts 110, 112 and the terminals (contacts) of the switch 108. In the cross-sectional view shown in FIG. 3, the contact is made between the lower end of the U-shaped regions 150, 152 and an upper surface of the contacts 126, 128. The linear contact therefore extends into the drawing plane of FIG. 3. Instead of the arc-shaped regions 150, 152, other shapes can be chosen that allow for linear contact with the terminals/contacts 126, 128 of the switch 108. For example, the first ends could also be provided with a V-shaped region.

As shown in FIG. 6, the first ends of the electrical contacts 110, 112 have a flaring 156, 158. The flarings 156, 158, in particular, serve to provide a larger abutment surface area of the first end opposite the contacts 126, 128 of the switch 108.

The switch 108 is a button designed as a microswitch, which comprises a push button 124 for activating the switch. For example, the push button 124 can be pretensioned to the position shown in FIG. 1. For this purpose, a resetting element (not shown), for example a flat spring, is provided within the microswitch 108. In conventional signal generators for opening signals of electrical door drives, corresponding buttons are controlled directly via an actuating mechanism. The actuation mechanism can, for example, consist of a door lever or door knob. In contrast, the module 100 according to the present disclosure comprises an actuating flap 120. In the installed state of the module 100, this is arranged between the actuation mechanism and the push button 124 of the microswitch 108. The actuating flap serves to protect the push button 124 from wear and tear. In particular, the actuating flap 120 reduces a shear movement relative to the push button 124 to a minimum.

The actuating flap 120 is hinged to the module housing 102 in a manner enabling it to pivot. For this purpose, the actuating flap 120 comprises one or more pivot pins (154, FIG. 4), which are anchored in corresponding pivot sockets of the housing 102. The actuating flap 120 is pivotable relative to the pivot axis A2 shown in FIG. 6. The pivot axis A2 is oriented substantially perpendicularly to a longitudinal axis A1 of the push button 124.

As can be seen in particular in FIG. 3, the actuating flap 120 comprises a curved inner surface 124, which is preferably in contact with the push button 124. Thus, when the actuating flap 120 is pivoted, the push button 124 can be actuated.

To pivot the actuating flap 120, it comprises a protrusion 122. For example it can be seen in FIG. 3 that this protrusion 122 has a ramp-like region and a shoulder region. The protrusion 122 serves to translate movement of the actuation mechanism (e.g., door lever) into a pivoting movement of the actuating flap 120 opposite the microswitch 108.

In FIG. 3, a first resetting element shown as a wire spring 148 is furthermore shown. The wire spring 148 is connected to the housing 102 on the one hand and a lever area 146 of the actuating flap 120 on the other hand. The first resetting element formed as a wire spring 148 serves to pretension the actuating flap 120 to the first position shown in FIG. 3. In the first position shown in FIG. 3, the actuating flap 120 is in particular arranged such that the push button 124 abuts the curved inner surface 142. Pivoting of the actuating flap 120 towards the push button 124 is accomplished against the resetting force of the wire spring 148.

Figure 4:
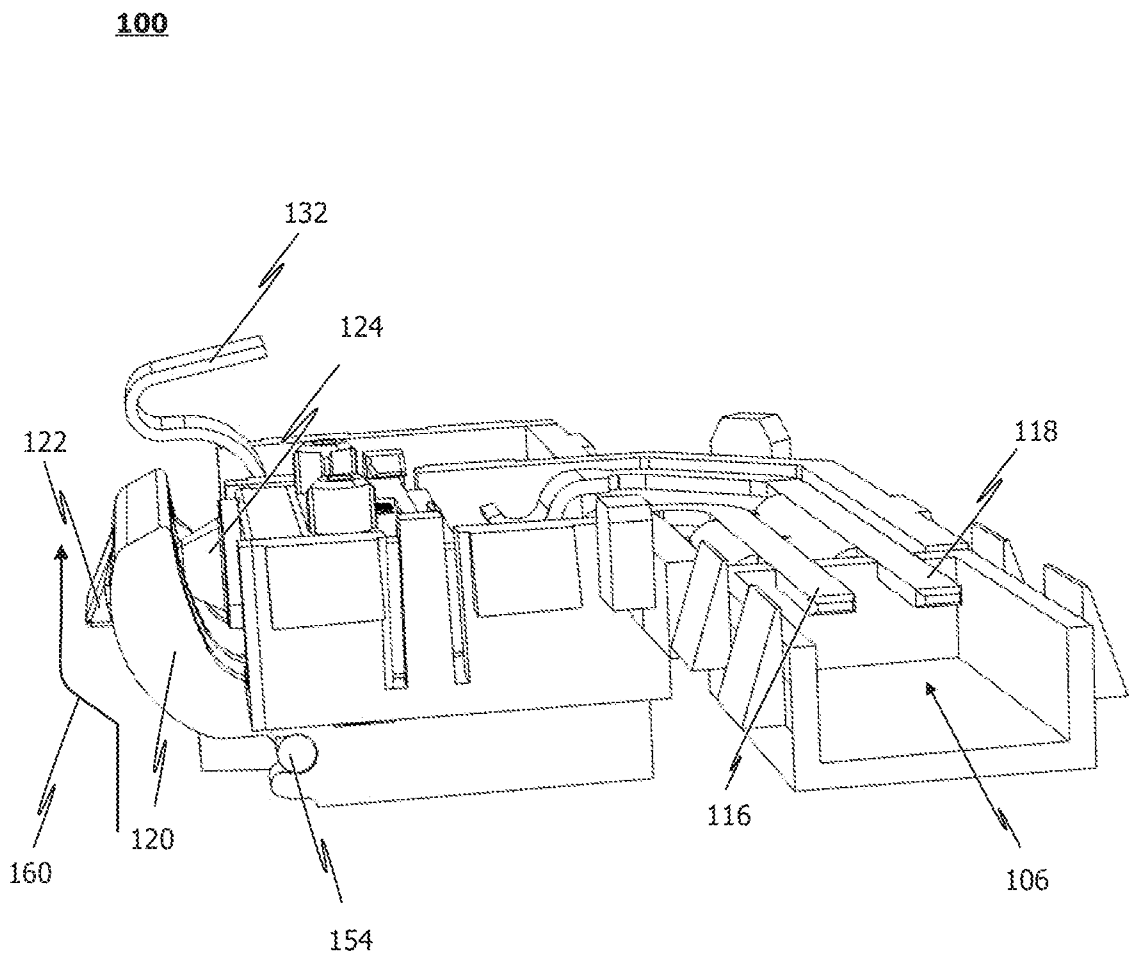
FIG. 4 is a schematic side perspective view of the module according to FIG. 1 in a first position of the actuating flap.
Figure 5:
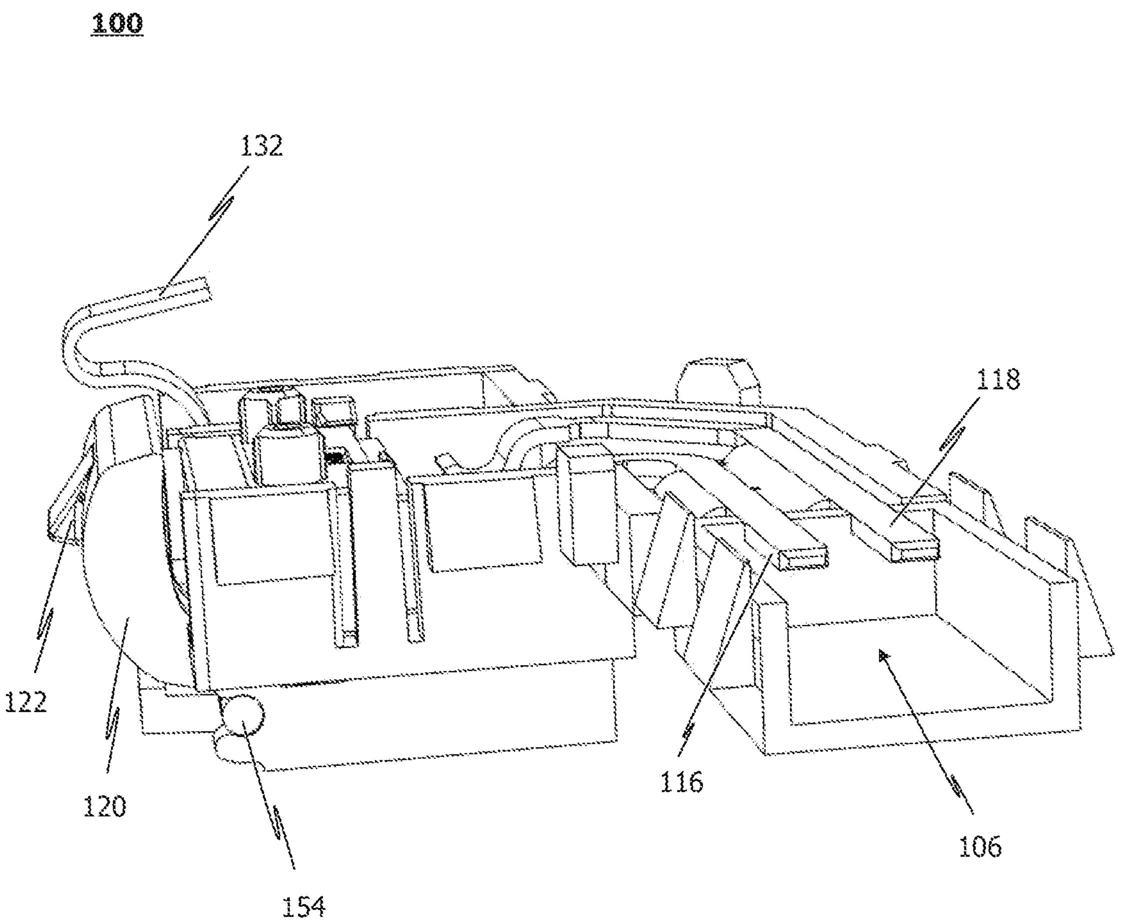
FIG. 5 is a schematic side perspective view according to FIG. 4 in a second position of the actuating flap.

FIGS. 4 and 5 show a comparison of the module in a first and second position of the actuating flap 120. In the normal state, that is, when the switch 108 is not to be actuated, the actuating flap 120 is in the first position shown in FIG. 4. In this first position, for example, the actuating flap abuts the tip of the push button 124. In this position, however, activation of the switch 108 by the push button 124 does not yet occur.

A surface 160 of an actuation mechanism is schematically shown in FIG. 4. The ramp-like surface 160 is herein oriented opposite the module and therefore opposite the actuating flap 120 such that when the actuation mechanism is moved (for example, pivoting the door lever), it moves over the protrusion 122 and thereby pivots the actuating flap 120 towards the push button 124.

A second position of the actuating flap 120 is shown in FIG. 5. In FIG. 5, the actuating flap 120 was pivoted clockwise by contacting the ramp-like surface 160 with the protrusion 122, that is, towards the push button 124. This activates the microswitch 108 without imparting significant longitudinal forces onto the push button 124. Rather, the interactions of the ramp-like surface 160 with the protrusion 122 translate the substantially translational movement of the actuation mechanism into a pivoting movement of the actuating flap 120, which then acts on the switch in the longitudinal direction of the push button 124. This significantly reduces wear of the push button 124.

The module 100 furthermore includes a second resetting element 132, shown herein as a resetting spring. The second resetting element 132 is arranged adjacently to the actuating flap 120, as shown in FIGS. 4 and 5. The second resetting element 132 is arranged such that the ramp-like surface 160 first contacts the protrusion 122 and transitions the actuating flap 120 to its second position before the actuation mechanism (e.g., the door lever) contacts the second resetting element 132. By contacting the actuation mechanism with the second resetting element 132, the user is provided with further haptic feedback. In particular, the second resetting element 132 acts as a movable stop. This means that, upon contact of the actuation mechanism with the second resetting element 132, the user initially experiences a resistance that acts against further movement of the actuation mechanism and feels like a limit stop during normal actuation. However, the second resetting element 132 can still be moved against its resetting force, especially when the actuation mechanism is continued with higher force. This can be used, for example, to move the actuation mechanism for a mechanical emergency release (e.g., via a Bowden cable) further than is the case with the perceived limit stop. Of course, this is only necessary in exceptional cases, so that the resetting force of the second resetting element 132 can be set relatively high.

Figure 7:
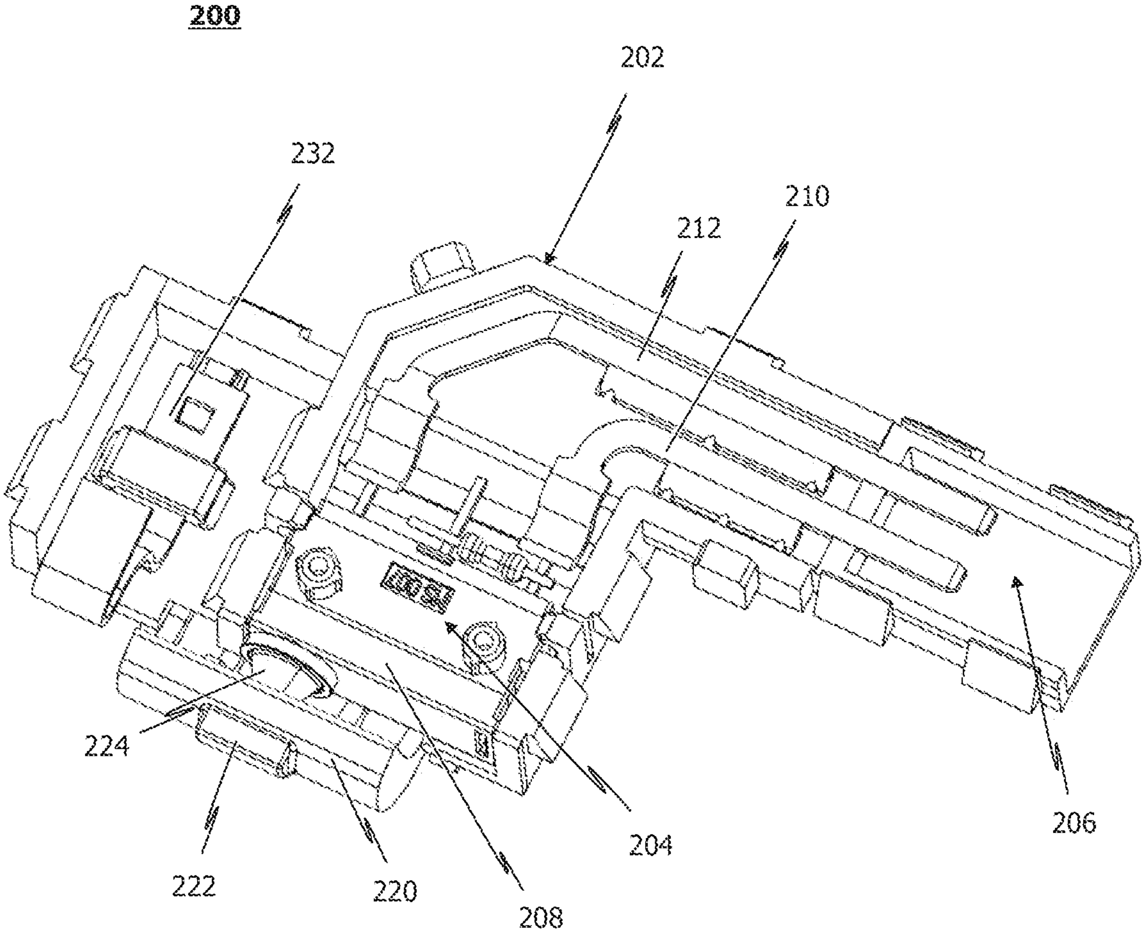
FIG. 7 is a schematic top perspective view of an example of the module according to the present disclosure.
Figure 8:
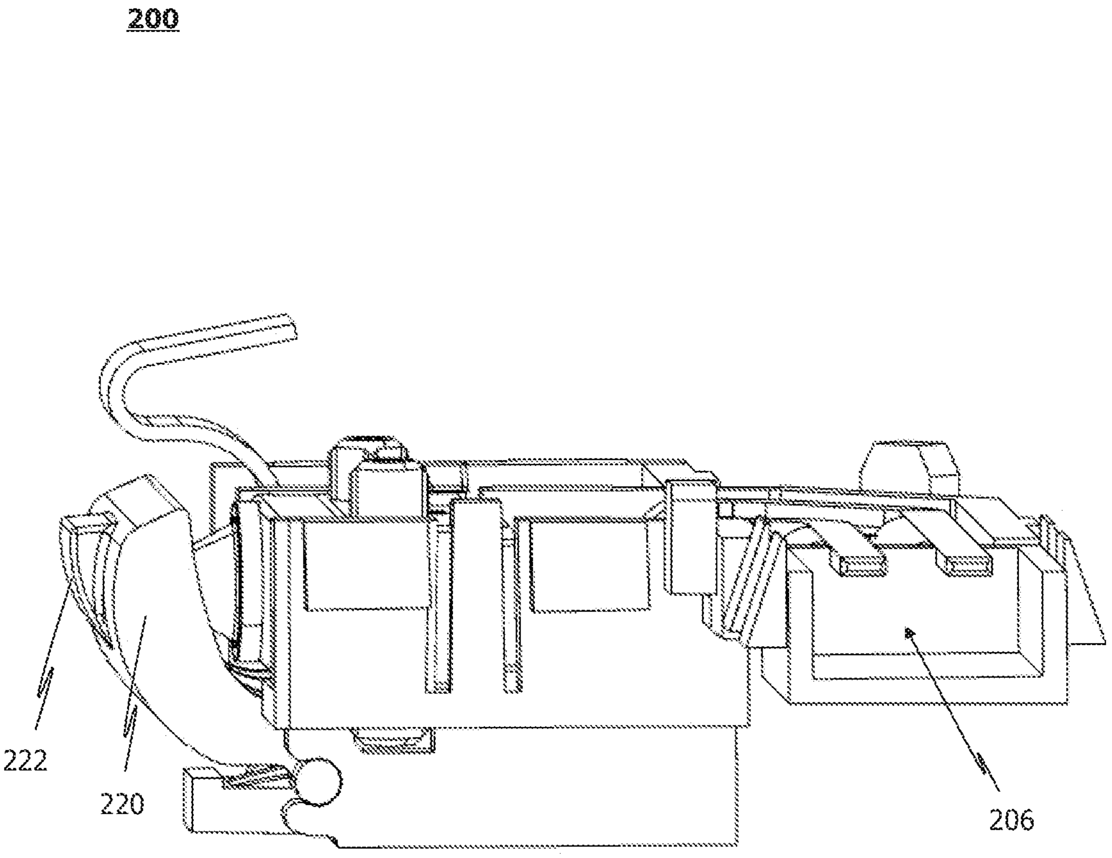
FIG. 8 is a schematic side perspective view of the module according to FIG. 7 in a first position of the actuating flap.

A second example of a module 200 according to the present disclosure can be seen in FIGS. 7-10. Herein FIG. 7 shows a schematic top perspective view of the module 200 according to the second example. The module 200 according to the second example also comprises a preferably one-piece housing 202. The housing 202 has a switch area 204 connected to a plug region 206. A switch, in particular a microswitch 208, is releasably connected to the switch region 204 of the housing 202. First and second electrical contacts 210, 212 are connected to the contacts of the switch 208 and at least partially extend into the plug region 206 of the housing 202. An actuating flap 220 is pivotally arranged on the housing 202. The actuating flap 220 serves to actuate a push button 224 of the switch 208. A second resetting element 232 is arranged adjacently to the actuating flap 220 and acts as a stop for the actuation mechanism in its open position.

The switch 208, electrical contacts 210, 212, and second resetting element 232 are substantially identical to the corresponding elements of the first module 100. The module 200 differs from the module 100 in particular by the configuration of the actuating flap 220 and the first resetting element 248 shown in FIG. 9.

Compared to the actuating flap 120 of module 100, the actuating flap 220 of module 200 has a protrusion 222 which is inversely arranged. In other words, the protrusion 222 has a protrusion with a shoulder region that is oriented upward. In contrast, the ramp area is oriented downward.

Figure 9:
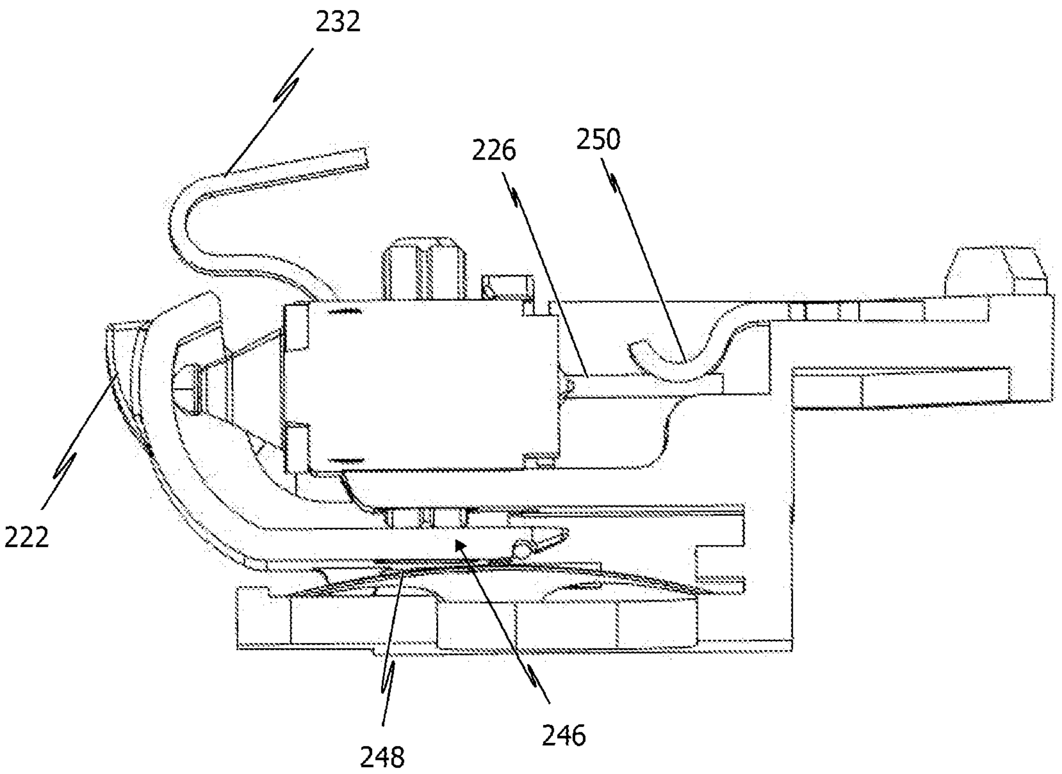
FIG. 9 is a schematic cross-section through the module shown in FIG. 8.

It can be seen from FIG. 9 that the actuating flap 220 is pretensioned to the first position. In particular, it is pretensioned to the first position by a first resetting element. The first resetting element 248 is designed as a flat spring connected to the housing 202 of the module 200. The flat spring is arranged at the bottom, i.e. on a lever area 246 of the actuating flap 220, in the illustration according to FIG. 9. The flat spring 248 pushes the actuating flap 220 counterclockwise in FIG. 9 and accordingly pretensions it to the first position. As long as the actuation mechanism is not activated, the actuating flap 220 is pretensioned to the first position shown in FIG. 9.

Figure 10:
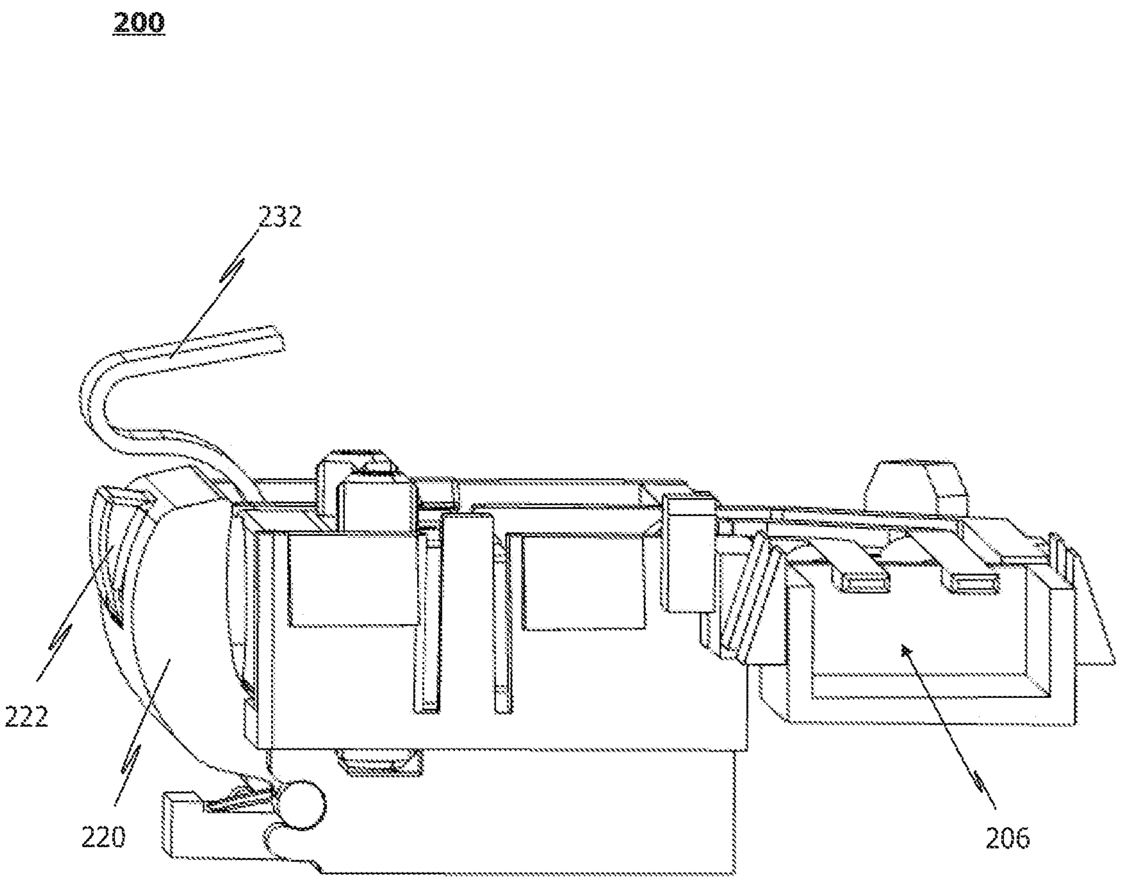
FIG. 10 is a schematic side perspective view of the module according to FIG. 7 in a second position of the actuating flap.

FIG. 10 shows module 200 in the second position. The flat spring 248 is deformed in the second position (not shown). When the actuating flap 220 is transferred to the second position, the flat spring is snapped over, which is in particular designed as a cracker. This generates an acoustic signal/feedback signaling to the user that actuation of the actuating flap and thus the switch 208 has occurred.

For example, when the switch 208 is actuated, a circuit can be closed to provide a power supply to a consumer, for example an electrical drive for opening/unlocking doors. In other examples, the circuit can be closed in the idle state of the switch, thereby interrupting the circuit when the switch is actuated by the operating element and the actuating flap 220. The disclosure is thus not limited to the function of the switch shown here, but essentially relates to the actuation of the switch by the actuating flap 220, which is arranged between the operating element (e.g., door lever) and the switch 108.

Another aspect lies in the connection of the terminals of the switch 108 to the plug region 106 by the electrical contacts 110, 112.

Once the user releases the actuation mechanism, the actuating flap 220 is transitioned to the first position by the flat spring 248. The flat spring 248 shown in FIG. 9 not only serves to pretension the actuating flap 220 to its first position, but also allows for further acoustic and/or haptic feedback upon activation of the switch 208.

Alternatively, the actuating flap 220 can also be pretensioned against the switch in its resting position, i.e., the actuating flap 220 can hold the switch pressed in its resting position. Accordingly, moving—in particular pivoting—the actuating flap via the operating element (e.g., door lever), would lead to the release or opening of the switch.

The present disclosure is not limited to the examples shown in the figures, but rather, results when all of the features disclosed herein are considered together. In particular, it is conceivable, for example, to use the wire spring of the first example in the second example. The same applies to the flat spring according to the second example, which can also be applied to the first example. The orientation of the protrusion of the actuating flap is also freely selectable. Also, only one switch is shown in each of the figures. However, it is conceivable that two or more switches are accommodated in the housing, and the electrical contacts are in communication with all of the switches simultaneously.

What is claimed is:

1. A module for generating signals for opening vehicle doors or flaps, wherein the module comprises:
- a one-piece housing having a plug region, a switch region, and a plurality of ramped protrusions;
- at least one switch, which is releasably connected to the switch region of the one-piece housing; and
- electrical contacts, which are releasably connectable to the at least one switch and extend from the switch region at least partially into the plug region, wherein the electrical contacts are configured to produce an electrical contact with an on-board plug for transmitting an electrical signal,
  - wherein the one-piece housing is configured to releasably connect to a vehicle component via the plurality of ramped protrusions.

2. The module according to claim 1, wherein the plug region comprises a socket for receiving the on-board plug, wherein the on-board plug is a plug of a control unit or an electrical actuator.

3. The module according to claim 1, wherein the plug region is configured such that the plug region, together with an actuator housing, forms a socket for receiving a plug of a control unit or an electrical actuator.

4. The module (100) according to claim 1, wherein the one-piece housing comprises a plurality of snap hooks for releasably connecting with the at least one switch.

5. The module according to claim 1, wherein the module comprises an actuating flap, which is pivotally connected to the one-piece housing and configured to transmit a movement of an operator element to the at least one switch so that the at least one switch is activated by a movement of the operator element.

6. The module according to claim 1, wherein the electrical contacts comprise a first resilient end, which contacts the at least one switch, and wherein the first resilient end of the electrical contacts is respectively biased against one of the contacts of the at least one switch when the module is connected to an operator element housing.

7. The module according to claim 1, wherein the electrical contacts extend substantially at a 90° angle between the switch region and the plug region.

8. The module according to claim 1, wherein the vehicle component is an operator element housing.

9. The module according to claim 1, wherein the vehicle component is a door lever housing.

10. The module according to claim 1, wherein the at least one switch is arranged so as to be activated by movement of an operator element, wherein the module comprises a first resetting element configured to act against a movement of the operator element.

11. The module according to claim 10, wherein the first resetting element is configured to generate a haptic and/or acoustic signal when the operator element activates the at least one switch.

12. The module according to claim 1, wherein the at least one switch is arranged so as to be activated by movement of an operator element, and wherein the module comprises a second resetting element, which is configured to act against a further movement of the operator element after it has activated the at least one switch.

13. The module according to claim 12, wherein the second resetting element is a resetting spring.

14. An actuating mechanism for opening vehicle doors, wherein the actuating mechanism comprises:

an operator element housing having an operator element pivotably stored therein; and a module according to claim 1, wherein the module is releasably connected to the operator element housing.

15. A vehicle having the actuating mechanism according to claim 14.

16. A module for generating signals for opening vehicle doors or flaps, wherein the module comprises:

a one-piece housing configured as an open half-shell that defines a plug region and a switch region;

at least one switch that is releasably connected to the switch region of the one-piece housing; and a plurality of electrical contacts that are releasably connectable to the at least one switch and extend from the switch region at least partially into the plug region, wherein the electrical contacts are configured to produce an electrical contact with an on-board plug for transmitting an electrical signal.

17. The module according to claim 16, wherein the one-piece housing is configured to releasably connect to a vehicle component via a plurality of ramped protrusions.

18. A module for generating signals for opening vehicle doors or flaps, wherein the module comprises:

a one-piece housing that defines a plug region and a switch region, wherein the plug region and the switch region are separate and distinct regions;

at least one switch that is releasably connected to the switch region of the one-piece housing; and a plurality of electrical contacts that are releasably connectable to the at least one switch and extend from the switch region into the plug region, wherein the electrical contacts are configured to produce an electrical contact with an on-board plug for transmitting an electrical signal.

19. The module according to claim 18, wherein the one-piece housing is as an open half-shell that defines the plug region and the switch region.

20. The module according to claim 18, wherein the one-piece housing is configured to releasably connect to a vehicle component via a plurality of ramped protrusions.

* * * * *